(12) United States Patent
Clarke et al.

(10) Patent No.: US 7,911,994 B2
(45) Date of Patent: Mar. 22, 2011

(54) CONFIRMATION OF DELIVERY OF CONTENT TO AN HTTP/TCP DEVICE

(75) Inventors: James Clarke, Banbridge (IE); John M. Coughlan, Belfast (IE)

(73) Assignee: Openwave Systems Inc., Redwood City, CA (US)

( * ) Notice: Subject to any disclaimer, the term of this patent is extended or adjusted under 35 U.S.C. 154(b) by 1023 days.

(21) Appl. No.: 10/739,555

(22) Filed: Dec. 17, 2003

(65) Prior Publication Data

US 2004/0205231 A1  Oct. 14, 2004

Related U.S. Application Data

(60) Provisional application No. 60/451,297, filed on Feb. 28, 2003.

(51) Int. Cl.
*G06F 15/16* (2006.01)
*H04W 4/00* (2009.01)
*H04L 12/28* (2006.01)

(52) U.S. Cl. ........ 370/328; 370/232; 370/352; 370/354; 370/381; 370/394; 709/218; 709/226; 709/228; 709/233; 709/249

(58) Field of Classification Search ........... 370/313, 370/328, 429, 431–438, 465–468, 352, 401; 709/226–250, 202, 203; 710/52, 53, 57
See application file for complete search history.

(56) References Cited

U.S. PATENT DOCUMENTS

| | | | | |
|---|---|---|---|---|
| 5,978,849 | A * | 11/1999 | Khanna | 709/227 |
| 6,041,374 | A * | 3/2000 | Postman et al. | 710/73 |
| 6,092,078 | A * | 7/2000 | Adolfsson | 1/1 |
| 6,247,060 | B1 * | 6/2001 | Boucher et al. | 709/238 |
| 6,266,701 | B1 * | 7/2001 | Sridhar et al. | 709/232 |
| 6,289,012 | B1 * | 9/2001 | Harrington et al. | 370/389 |
| 6,321,272 | B1 * | 11/2001 | Swales | 709/250 |
| 6,711,621 | B1 * | 3/2004 | Mitra et al. | 709/230 |
| 6,735,647 | B2 * | 5/2004 | Boyd et al. | 710/52 |
| 6,760,782 | B1 * | 7/2004 | Swales | 709/250 |
| 6,789,050 | B1 * | 9/2004 | Reeser et al. | 703/2 |
| 6,826,622 | B2 * | 11/2004 | Maciel | 709/238 |
| 6,826,763 | B1 * | 11/2004 | Wang et al. | 719/330 |
| 6,829,662 | B2 * | 12/2004 | King-Smith et al. | 710/56 |
| 6,831,912 | B1 * | 12/2004 | Sherman | 370/349 |
| 6,862,276 | B1 * | 3/2005 | Abrol et al. | 370/349 |
| 6,882,654 | B1 * | 4/2005 | Nelson | 370/401 |
| 6,920,501 | B2 * | 7/2005 | Chu et al. | 709/228 |
| 6,990,531 | B2 * | 1/2006 | Vange | 709/240 |
| 7,117,267 | B2 * | 10/2006 | Bavadekar | 709/230 |
| 7,133,361 | B2 * | 11/2006 | Olariu et al. | 370/230 |
| 7,155,539 | B2 * | 12/2006 | Vange et al. | 709/250 |

(Continued)

OTHER PUBLICATIONS

Banks, Andrew, et al., "HTTPR Specification Draft Proposal", Version 1.1, pp. 1-63, IBM, Dec. 3, 2001, XP-002285259.

*Primary Examiner* — Salman Ahmed
*Assistant Examiner* — Venkatesh Haliyur

(57) ABSTRACT

A method to confirm delivery of data to a receiving device via a sending socket is disclosed. One embodiment of the method comprises determining when a predetermined amount of data has been removed from a send buffer of the sending socket and sending a confirmation when the predetermined amount of data has been removed from the send buffer. Other embodiments are described and claimed.

3 Claims, 3 Drawing Sheets

U.S. PATENT DOCUMENTS

| | | | |
|---|---|---|---|
| 7,174,393 B2 * | 2/2007 | Boucher et al. | 709/250 |
| 7,191,241 B2 * | 3/2007 | Boucher et al. | 709/230 |
| 7,203,775 B2 * | 4/2007 | Van Doren et al. | 710/52 |
| 7,219,157 B2 * | 5/2007 | Blott et al. | 709/238 |
| 7,284,070 B2 * | 10/2007 | Boucher et al. | 709/250 |
| 7,305,486 B2 * | 12/2007 | Ghose et al. | 709/232 |
| 7,305,493 B2 * | 12/2007 | McAlpine et al. | 709/250 |
| 7,571,247 B2 * | 8/2009 | Banerjee et al. | 709/232 |
| 7,630,305 B2 * | 12/2009 | Samuels et al. | 370/229 |
| 7,656,799 B2 * | 2/2010 | Samuels et al. | 370/231 |
| 7,698,453 B2 * | 4/2010 | Samuels et al. | 709/234 |
| 7,734,824 B2 * | 6/2010 | Gormish et al. | 709/247 |
| 7,827,237 B2 * | 11/2010 | Plamondon | 709/203 |
| 2001/0003164 A1 | 6/2001 | Murakami | |
| 2001/0034791 A1 * | 10/2001 | Clubb et al. | 709/238 |
| 2002/0002618 A1 * | 1/2002 | Vange | 709/228 |
| 2002/0078135 A1 * | 6/2002 | Venkatsubra | 709/202 |
| 2002/0186660 A1 * | 12/2002 | Bahadiroglu | 370/248 |
| 2003/0014623 A1 * | 1/2003 | Freed et al. | 713/150 |
| 2003/0014624 A1 * | 1/2003 | Maturana et al. | 713/151 |
| 2003/0097461 A1 * | 5/2003 | Barham et al. | 709/235 |
| 2003/0115357 A1 * | 6/2003 | Chu et al. | 709/237 |
| 2003/0154244 A1 * | 8/2003 | Zellers et al. | 709/203 |
| 2003/0165160 A1 * | 9/2003 | Minami et al. | 370/466 |
| 2004/0049612 A1 * | 3/2004 | Boyd et al. | 710/52 |
| 2004/0103225 A1 * | 5/2004 | McAlpine et al. | 710/52 |
| 2005/0108710 A1 * | 5/2005 | Patiejunas | 718/100 |

* cited by examiner

CONFIRMATION OF DELIVERY OF CONTENT TO AN HTTP/TCP DEVICE

This Application claims the benefit of U.S. Provisional Patent Application No. 60/451,297, filed on Feb. 28, 2003, and entitled, "Confirmation of Delivery of Content to an HTTP/TCP Device," which is incorporated herein by reference.

FIELD OF THE INVENTION

This invention relates to the field of wireless communication. In particular, this invention relates to confirmation of data delivery to a client from a proxy or a server of a wireless carrier network without a specific indication from the client.

BACKGROUND

Electronic-commerce (e-commerce) has become increasingly important in today's society. People make purchases online using their personal computers (PCs), laptop PCs, Personal Digital Assistants (PDAs), cellular phones, etc. In particular, people may purchase text, icons, video, music, and other intangible content that is delivered to their mobile communication device upon request. Usually, the request for the content and the response are sent using Hypertext Transfer Protocol (HTTP).

Typically, the HTTP response is transmitted between systems implementing transfer control protocol (TCP). When an HTTP-based application writes data of the HTTP response to a TCP socket provided by an operating system using one of a range of write commands, the data is placed in a TCP send buffer for that socket, and the write command returns. In general, the fact that the write command has returned merely indicates that the data has been written to the TCP send buffer, and a returning write command does not confirm that the data has been sent to the TCP receiving stack.

Upon receipt of the data, the TCP receiver transmits one or more acknowledgments to the sender to indicate the successful receipt of the data segments. The TCP receiver sends a final acknowledgment, also referred to as the last ACK signal, to the TCP sender indicating the receipt of the final segment of data. However, the standard TCP socket Application Program Interface (API) does not provide an indication of the receipt of the last ACK signal to the sending application to confirm the successful receipt of the data by the TCP receiver.

With prior technology, there is no way of telling at the HTTP level that the HTTP response has been delivered successfully to the requester, i.e., the HTTP client. HTTP typically does not include any feature to allow an HTTP client to confirm the receipt of the HTTP response with the server or a proxy that sends the HTTP response. However, where a communication carrier wishes to charge the user for the receipt of the data or content in the HTTP response, the ability to determine that the HTTP response has been delivered successfully is important for billing customers on such services correctly.

At least two potential solutions to the above problem are unsatisfactory. One solution proposes to extend HTTP to support functionalities via which the client may indicate the successful receipt of the HTTP response. Such additional functionalities would have to be successfully adopted by the relevant standard setting bodies to ensure that the future HTTP-compatible devices support the additional functionalities.

Another potential solution is to modify the TCP stack to capture the last acknowledgement of the transmission of the HTTP response, and to extend the standard TCP API to allow the TCP stack to indicate data delivery to the sending HTTP-based application. However, since most TCP stacks are shipped with an operating system, it is difficult, if not impractical, to modify the TCP stacks. Moreover, generating a separate TCP stack in addition to the TCP stacks shipped with the operating system by a service provider is time consuming as well as impractical.

SUMMARY

A method to confirm delivery of data to a receiving device via a sending socket is disclosed. One embodiment of the method comprises determining when a predetermined amount of data has been removed from a send buffer of the sending socket and sending a confirmation when the predetermined amount of data has been removed from the send buffer.

In a specific embodiment of the present invention, the sending socket implements transport control protocol (TCP).

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
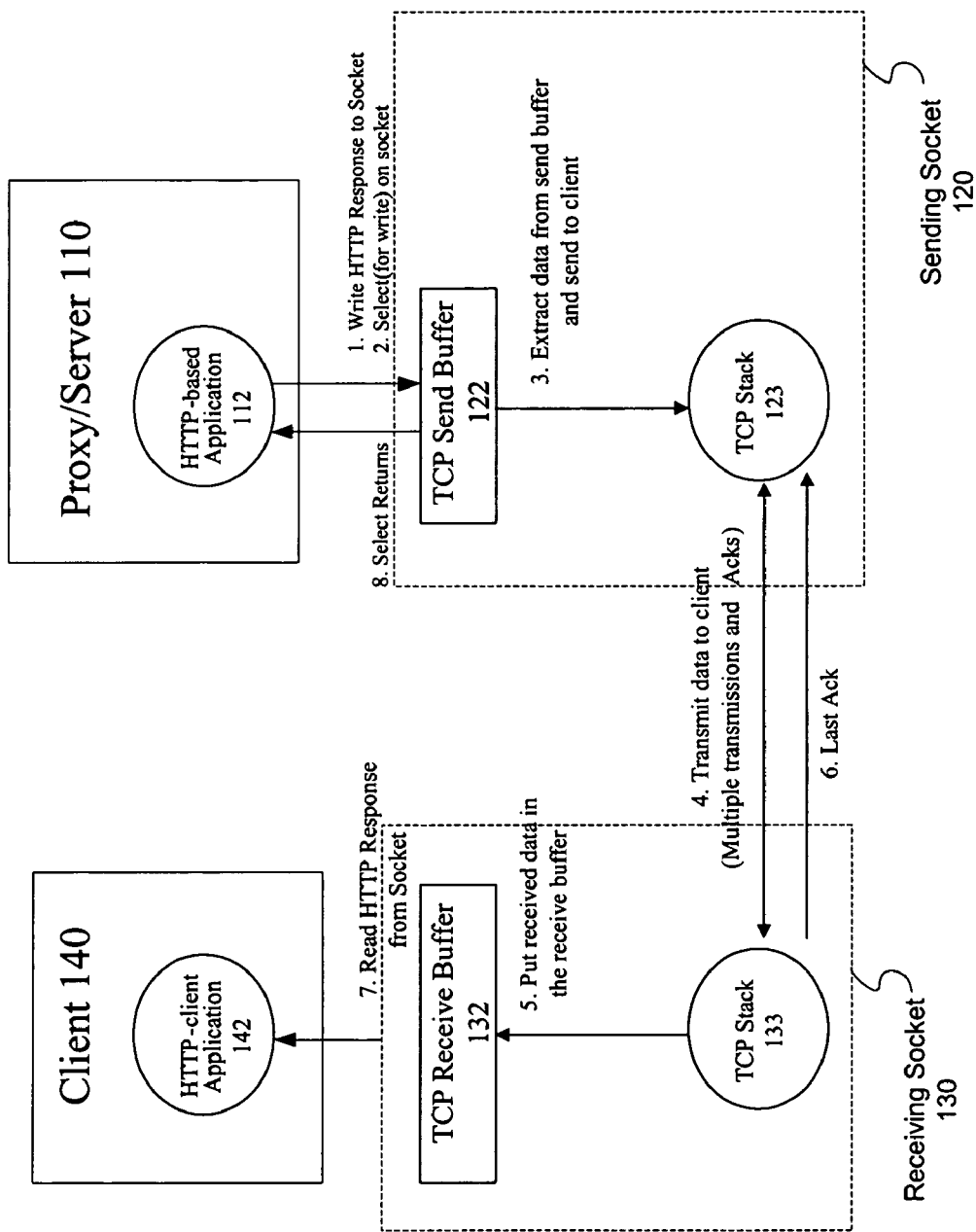
FIG. 1 illustrates one embodiment of a wireless communication system to provide confirmation of data delivery.

In the following description, numerous specific details are set forth. However, it is understood that embodiments of the invention may be practiced without these specific details. In other instances, well-known circuits, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; and flash memory devices.

FIG. 1 illustrates one embodiment of a wireless communication system to provide confirmation of data delivery. The system 100 includes a device 110 of a carrier network, a sending socket 120 having a send buffer 122 and a stack 123, a receiving socket 130 having a receive buffer 132 and a stack 133, and a client device 140. The device 110 may include a proxy or a server. Therefore, in the following description, the device 110 is also referred to as a proxy/server 110. The client device 140 may be a mobile communication device, such as a cellular phone, a pager, a PDA, etc.

Different embodiments of the system 100 may implement various protocols to transmit data. For instance, the system 100 may implement a version of transmission control protocol (TCP) without a specific acknowledgement mechanism. Then the stacks 123 and 133 in the system 100 may be TCP stacks. Examples of operating systems providing TCP stacks include Solaris from Sun Microsystems, Inc. (Santa Clara, Calif.), AIX from International Business Machine Corporation (Armonk, N.Y.), etc. TCP stacks typically provide a standard API for managing and using sockets. Although the following description is directed to an exemplary system implementing TCP, one should appreciate that the invention is not necessarily limited to TCP.

In one embodiment, an HTTP-based application 112 of the device 110 of the carrier network sends data to the client device 140. The HTTP-based application 112 may send the data in response to a request from an HTTP-client application 142 of the client device 140.

The HTTP-based application 112 transmits data by writing the data onto a sending socket using an appropriate API command, such as Written or Write for a TCP socket. The act of writing the data to the sending socket 120 causes the data to be placed into the send buffer 122 rather than sending the data directly to the TCP receiving socket 130 of the client 140. The TCP sending socket 120 retrieves the data from the send buffer 122 and transmits the data via the TCP stack 123 to the TCP receiving socket 130 of the client device 140 according to the rules defined in TCP. Upon receipt of the data at the receiving TCP stack 133, the data is placed in the TCP receive buffer 132 so that the data becomes available to the HTTP-client application 142. Then the TCP receiving socket 130 sends acknowledgements to the TCP sending socket 120 to indicate the receipt of the data. The TCP sending socket 120 may deliver the data to the TCP receiving socket 130, possibly in multiple segments, and possibly with retransmissions, according to the rules of TCP.

In one embodiment, the TCP send buffer 122 is monitored to determine when the TCP sending socket 120 has removed substantially all of the data from the TCP send buffer 122. The TCP sending socket 120 removes data from the TCP send buffer 122 when the data has been successfully delivered to the TCP receiving socket 130. Thus, by determining when the TCP sending socket 120 has substantially cleared the send buffer 120, it can be inferred that the client device 140 has successfully received the data.

In order to determine when the TCP send buffer 122 has been substantially cleared, a confirmation delivery application of the proxy/server 110 may determine the size of the TCP send buffer 122 utilizing socket options. The confirmation delivery application may be part of the HTTP-based application 112 or a software module substantially independent of the HTTP-based application 112. The confirmation delivery application sets a threshold, also referred to as a "low water" mark, to be substantially equal to the size of the TCP send buffer 122. Therefore, the "low water" mark essentially defines how much space there should be in the send buffer 122 in order for the send buffer 122 to be considered available for writing. The send buffer "low water" mark may be used with the select command of the socket API such that the select command returns to the HTTP-based application 112 when the available space of the send buffer 122 reaches the "low water" mark.

Alternatively, the "low water" mark may be set by other mechanisms, such as by setting the configuration parameters that may apply to a single socket, one or more predetermined groups of sockets, or all sockets in the system. For instance, the configuration parameter for the "low water" mark may be set to a particular value such that when a new socket is created, the new socket gets a value based on the configuration parameters by default as the socket's "low water" mark; thus, the value of the "low water" mark may not be specified explicitly each time a socket is created. However, one should appreciate that the default may be overridden in some embodiments, and thus, the "low water" mark of a new socket may be set explicitly when the new socket is created.

As discussed above, the data is placed in the TCP send buffer 122 upon writing the data to the sending socket 120. Then the confirmation delivery application running on the proxy/server 110 issues a command against the sending socket 120, such as the select command of the socket API. In one embodiment, the select command returns when the available space in the send buffer reaches the send buffer "low water" mark. Since the value of the send buffer "low water" mark is substantially equal to the size of the send buffer 122, the select command returns when the send buffer 122 is substantially empty, thus indicating that the data written to the send buffer 122 has been delivered to the receiving TCP stack 133. However, in some embodiments, other TCP socket API commands may be used to determine when the TCP send buffer 120 has been substantially cleared in order to enable confirmation of data delivery.

Figure 2:
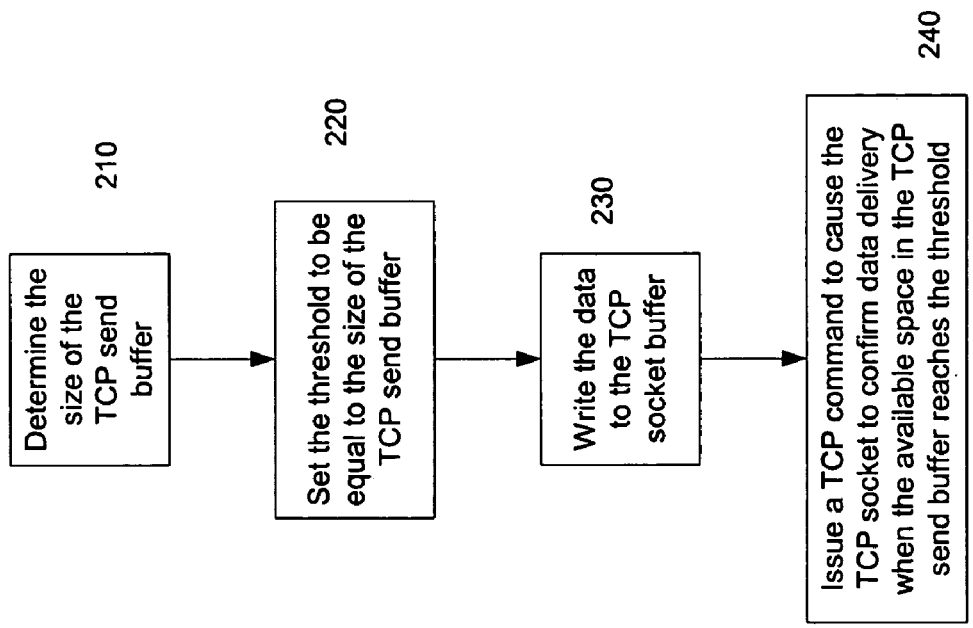
FIG. 2 illustrates a flow diagram of one embodiment of a process to confirm data delivery from a carrier network to a client device.

FIG. 2 illustrates a flow diagram of one embodiment of a process to confirm data delivery from a carrier to a client device. The process is performed by processing logic that may comprise hardware (e.g., circuitry, dedicated logic, etc.), software (such as the confirmation delivery application discussed above) running on a general-purpose computer system or a dedicated machine (e.g., the proxy/server 110 in FIG. 1), or a combination of both.

Processing logic first determines the size of a send buffer of a sending socket (processing block 210). Then processing logic sets a threshold, also referred to as a "low water" mark, substantially equal to the size of the send buffer (processing block 220). To send data from the carrier, processing logic writes the data to the send buffer (processing block 230). Processing logic issues a command against the sending socket such that the command returns when the available space in the send buffer reaches the threshold (processing block 240). In one embodiment, the carrier network implements TCP. The command issued against the sending TCP socket is a select command of the socket API.

One advantage of using an existing TCP socket API command is to provide compatibility with the existing TCP devices in the market. The use of the existing TCP socket API command also reduces the overhead in data transmission by avoiding the addition of more messages to the protocol in order to support specific acknowledgement. Moreover, using the existing TCP socket API command does not increase traffic on the network, which is particularly important for mobile communication.

Figure 3:
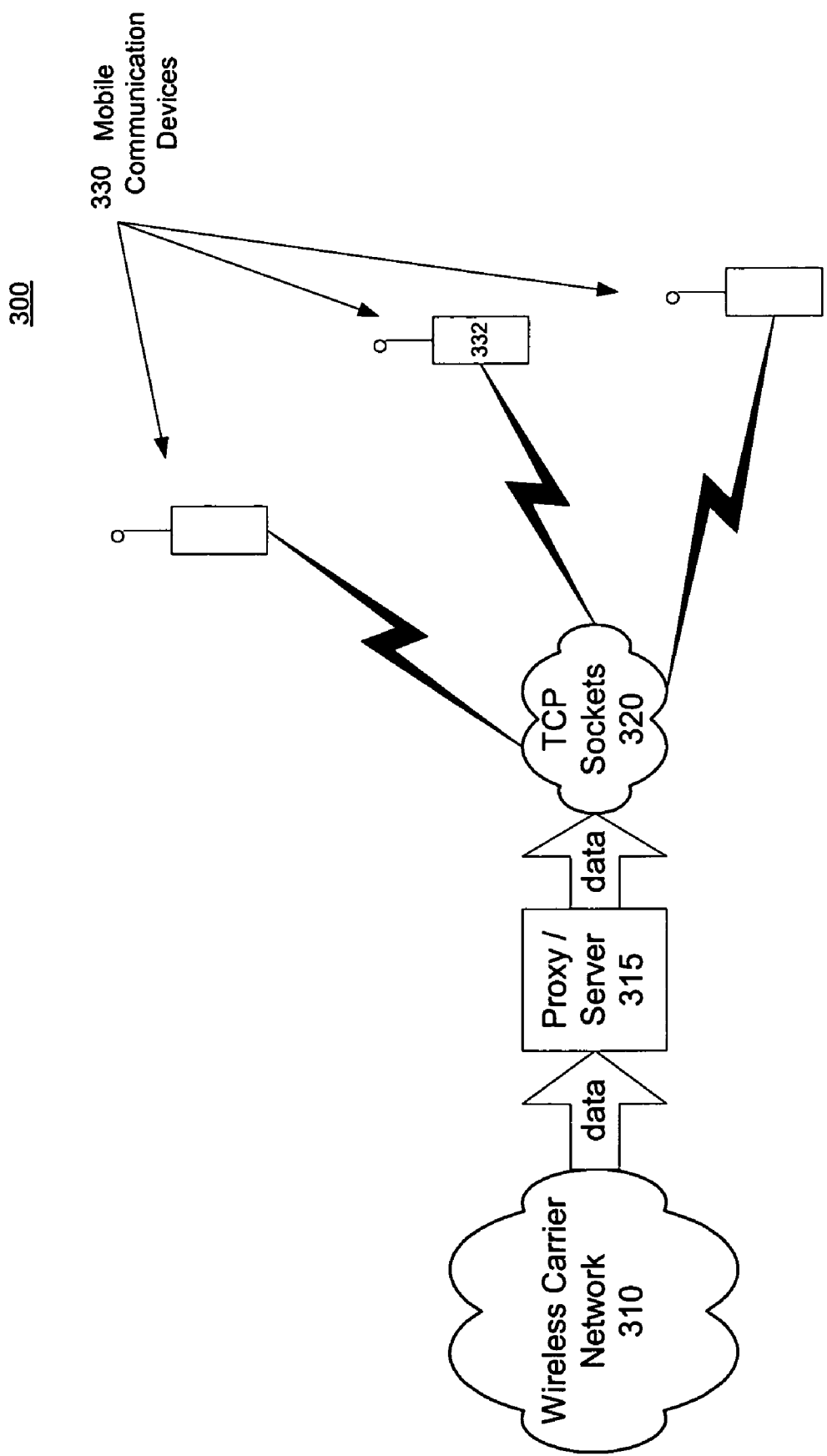
FIG. 3 illustrates an exemplary embodiment of a wireless communication system.

FIG. 3 illustrates an exemplary embodiment of a mobile communication system in which the invention can be implemented. The system 300 includes a wireless carrier network 310, a proxy/server 315, a number of TCP sockets 320, and a number of mobile communication devices 330. The wireless network 310 sends data via the proxy/server 315 to one of the mobile communication devices 330 using one of the TCP sockets 320. The TCP sockets 320 may be bi-directional. For the purpose of illustration, it is assumed that the data is sent to the receiving mobile communication device 332 in the following description. In one embodiment, the mobile communication device 332 sets up a TCP link with the proxy/server 315. As a result, a first socket is created at the proxy/server 315 end of the link for the proxy/server 315. The proxy/server 315 may use the first socket to send or receive data from the mobile communication device 332. Likewise, a second socket is created at the other end of the link for the receiving device 332, which may use the second socket to send or receive data from the proxy/server 315.

To enable confirmation of data delivery to the proxy/server 315, a confirmation delivery application running on the proxy/server 315 first determines the size of the send buffer of one of the TCP sockets 320, hereinafter referred to as a sending socket. Then a threshold, also referred to as a "low water" mark, is set to be substantially equal to the size of the send buffer. After writing data to the send buffer of the sending socket, the confirmation delivery application issues a command against the sending socket. The command issued may be a select command of the socket API.

When the available space of the send buffer reaches the threshold, the select command is returned to the proxy/server 315. Since the threshold is substantially equal to the size of the send buffer and the available space of the send buffer reaches the threshold, therefore, the send buffer is substantially empty. Given that the sending socket removes data from the send buffer when the acknowledgement of data receipt is received from a receiving socket, which is one of the TCP sockets 320, one can infer from the substantially empty send buffer that the receiving socket has received substantially all data written into the send buffer. Therefore, when the select command is returned to the proxy/server 315, the confirmation delivery application can confirm that the receiving socket of the mobile communication device 332 has received the data.

Being able to confirm data delivery allows the wireless carrier network 310 to provide more reliable communication services to the mobile communication devices 330. Furthermore, the ability to confirm data delivery helps the network carrier to correctly bill the users of the client devices 330 for the data or content delivered, which is important for customer satisfaction.

Although the present invention has been described with references to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method for confirming delivery of an HTTP response sent from an HTTP-based application of a proxy/server, to an HTTP-client application of a mobile communication device, via a sending TCP socket having a TCP send buffer, the method comprising:

setting a threshold to be, equal to the size of the TCP send buffer of the sending TCP socket, the threshold being referred to as a low water mark and defining how much space there should be in the TCP send buffer in order for the TCP send buffer to be considered available for writing;

issuing a TCP socket API command against the sending TCP socket from a confirmation delivery application of the proxy/server such that the command returns from the sending TCP socket to the confirmation delivery application when the available space in the TCP send buffer reaches the low water mark;

writing data of the HTTP response to the TCP send buffer;

removing data of the HTTP response from the TCP send buffer when, a TCP acknowledgment is received at the sending TCP socket from the receiving device, wherein the TCP acknowledgements acknowledges the receipt of data that was, sent from the sending TCP socket, to the receiving TCP socket;

monitoring the TCP socket send buffer to detect a change in the amount of data in the TCP send buffer;

detecting an event where a threshold amount of data has been removed from the TCP send buffer, the threshold amount of data corresponding to the low water mark; and upon detecting the event, returning the command, from the sending TCP socket to the confirmation delivery application of the proxy/server, the returned command, indicating that the HTTP response has been delivered to the receiving TCP socket the mobile communication, device.

2. The method of claim 1, wherein after the confirmation is sent, the TCP send buffer is ready to receive more data to be written.

3. The method of claim 1, wherein the TCP send buffer becomes available for writing when the threshold amount of data has been removed from the TCP send buffer.

* * * * *